Oct. 6, 1959

W. M. McCONNELL 2,907,202

PIPE EXPANSION AND TESTING APPARATUS

Filed Dec. 23, 1955

INVENTOR.
William M. McConnell
BY
Webb, Mackey & Burden
HIS ATTORNEYS

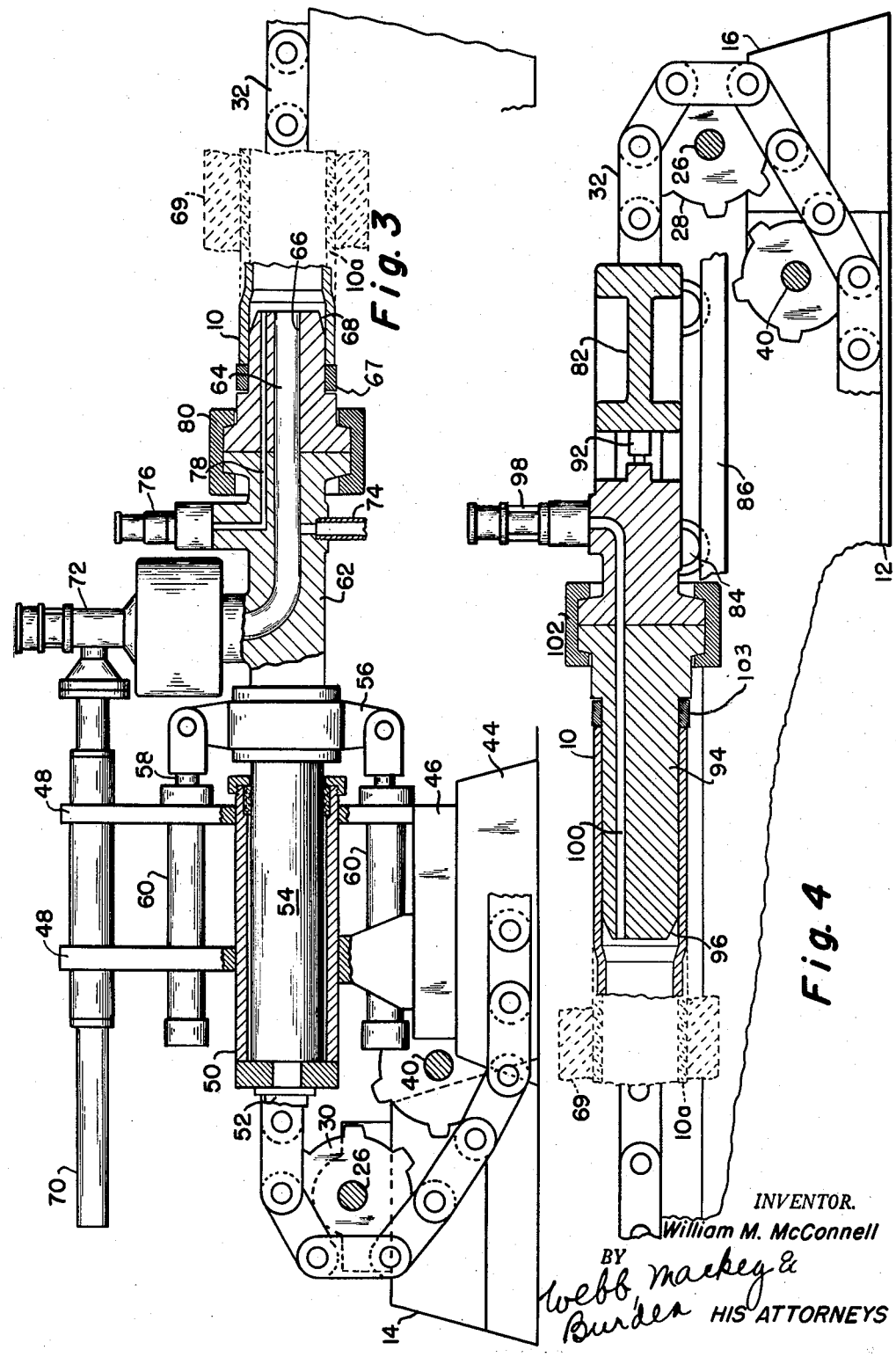

INVENTOR.
William M. McConnell

United States Patent Office 2,907,202
Patented Oct. 6, 1959

2,907,202

PIPE EXPANSION AND TESTING APPARATUS

William Mynard McConnell, McKeesport, Pa., assignor to Taylor-Wilson Manufacturing Company, McKees Rocks, Pa., a corporation of Pennsylvania Application December 23, 1955, Serial No. 555,149

13 Claims. (Cl. 73—49.6)

The present invention relates to pipe expansion and testing apparatus for internally pressurizing and expanding a section of pipe between two relatively shiftable sealing heads, and more particularly relates to follow-up mechanism for use in such apparatus to cause the heads to follow and to be kept sealed to the ends of the pipe sections as the latter foreshorten due to the expanding girth and consequent loss of length of the pipe.

It is old and well known to test pipe hydraulically for its mechanical strength and for leakage prior to marketing the same, and many pipe manufacturing concerns employ testing apparatus or machines for this purpose, subjecting the pipe to internal test pressures of 5,000–10,000 p.s.i. and sometimes more. Test heads for sealing the ends of the pipe are mechanically or hydraulically clamped thereto in sealed relation and are forced to thrust thereagainst with constant or variable pressure as the internal pressure is applied to the pipe. Compared to testing machines of the foregoing characteristic, a combined testing and expansion machine as herein presented is complicated in two respects, first, in that the pressure necessary for expansion greatly exceeds the simple test pressures just considered, and in that, second, the pipe foreshortens as it expands or swells girthwise in the machine and the ends of the pipe creep and are difficult to be kept sealed. According to a feature of the present machine, a thrust sensitive control provides for pipe end follow-up and sealing the same as a function of the pipe end thrust above a predetermined minimum, and additionally, a pressure sensitive control provides for end pressure sealing of the pipe as a function of the internal expanding pressure on the pipe. Consequently, the present combined expansion and testing machine operates with ease and more than adequately copes with the complications due to the high pressure and to the foreshortening action of the pipe. The merit of expanded pipe compared to unexpanded pipe resides in its added strength due to the working of the metal crystals and results in added carrying capacity due to added girth, and the present machine is particularly suited for accomplishing such improvements on the pipe.

According to a further feature of the invention, a novel sealing head drive is provided for pipe machines of the above character, wherein an endless driven chain is used to force the head toward and from an end of the pipe. Preferably the chain is employed as a two-way driven member in conjunction with the follow-up mechanism of the immediately preceding paragraph. More specifically, two endless driven chains are employed under control of the follow-up mechanism and together these chains can produce a maximum end load of 1,200,000 pounds, such as may be necessary, for example, on a 60 foot length of 16" outside diameter pipe.

Further features, objects, and advantages will either be specifically pointed out or become apparent when, for a better understanding of the invention, reference is made to the following description taken in conjunction with the accompanying drawings, in which, in general:

Figures 3 and 4 are enlarged elevational views corresponding to the respective left and right ends of Figure 1 and showing the apparatus thereof in greater detail.

Figure 1:
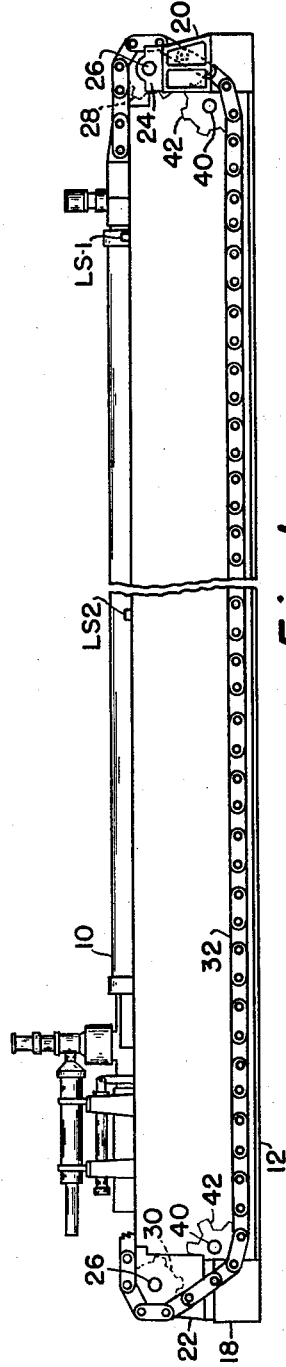
Figures 1 and 2 are front elevation and top plan views, respectively, of the present apparatus.
Figure 2:
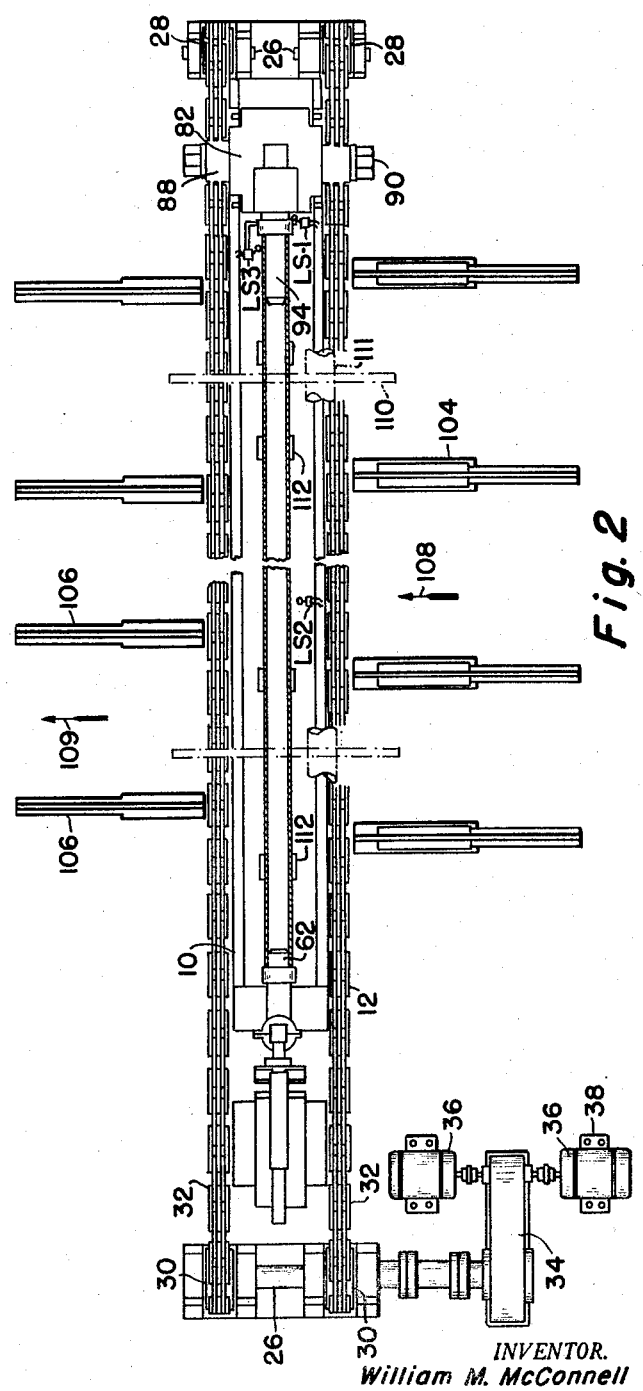

In particular, in Figures 1 through 4, a pipe expansion and testing apparatus is shown for use in expanding and testing a tubular member, such as a length of steel pipe 10. The apparatus includes a long floor-supported frame 12 of general rectangular shape having at its opposite ends a pair of stationary floor-supported pillars 14 and 16. Each of the pillars 14 and 16 has a pair of laterally extending wing portions 18, and each wing portion 18 supports a pair of inboard and outboard bearing pedestals, one of which is shown at 20 and another at 22. Each pair of bearing pedestals supports a bearing 24, and the bearings in turn straddle and support a sprocket shaft 26. The sprocket shaft 26 at the right end of the present apparatus is divided into two axially aligned sections, each of which carries a chain-carrying sprocket 28. The sprocket shaft 26 at the left end of the machine, Figure 2, is splined to and carries a pair of spaced-apart drive sprockets 30 which, in common with the sprockets 28, carries a pair of endless heavy chains 32. The drive sprockets 30 are driven through a speed reduction gear box 34, connected to the shaft 26 and driven by means of a pair of electric motors 36 which are direct current machines each having a rated capacity of 250 horsepower in one embodiment of the present invention. The gear box 34 provides for a range of driving speeds for the sprockets 30 of 6 to 0 r.p.m., the latter being, of course, the stall speed. The motors 36 are suitably anchored to a supporting surface, such as a floor, by means of a pair of motor support brackets 38.

At each of the opposite ends of the present apparatus, a pair if idler sprocket shafts 40 is journaled for rotation, and each sprocket is engaged with endless chains 32, the sprockets being indicated at 42. At the left end of the machine, a floor-supported stationary pedestal 44 carries a pedestal 46 supporting a pair of spaced upright members 48. Intermediate their top and bottom ends, the spaced upright members support a hydraulic jack motor 50 having a hydraulic inlet pipe 52 adapted to be pressurized at one end and containing a pressure movable jack plunger 54. At its working end, the jack plunger 54 rigidly carries a double-ended bar 56, which is pivotally connected at its upper and lower ends to the piston rods 58 of a pair of vertically spaced double-acting setout motors 60. The uprights 48 stationarily carry the cylinders for the double-acting set-out motors 60. The double-ended bar 56 carries a tubular sealing head 62 of bipartite construction having a coupling member 80 formed of split collars for holding the parts together and defining a hydraulic inlet passage 64 communicating internally with the piece of pipe 10 through a bore 66. Adjacent the mouth of the bore 66, the sealing head 62 is beveled at 68 for appropriately engaging the end of the pipe which may be flared so as to fit onto the sealing head in engagement with a spacer ring 67 which is backed up against a shoulder provided on the sealing head 62. Internal pressurizing of the pipe causes it to swell against a mantle 69 from the solid line of Figure 3 into the dotted line position 10a, in which it forms a uniform continuation of the flared end thereof received on the sealing head. The sealing head is supplied with hydraulic fluid, which may be water, through an inlet 70 under control of a fill check valve 72 which controls entry and venting of water through the passage 64.

The fill check valve 72 is more completely illustrated in the McConnell Patent No. 2,707,876. A pressure sampling tube 74 intersects the passage 64 and is connected to a pressure sensitive device, hereinafter described. An air purge valve 76 communicates through a passage 78 with the end of the sealing head 62 adjacent the mouth of the bore 66.

At the opposite end, as more particularly shown in Figure 4, the frame 12 has a carriage 82 which carries four spaced-apart wheels 84. The wheels 84 roll on appropriate trackways, as at 86, carried by the frame 12. The carriage 82, at its opposite lateral sides, carries a pair of stationary links 88 which are connected and included within the endless chains 32 and which are bolted at 90 to the sides of the carriage 82. Movement of the chains under driving motion by the motors 36 causes the carriage to move on the wheels 84 in the tracks 86 toward and from the flared end of the pipe 10. A pair of limit switches LS1 and LS2 are engageable by the carriage 82 in its extreme positions of movement on the tracks 86. A compression type strain gauge, more commonly called a compression load cell, is indicated at 92 clamped between the carriage 82 and a bipartite test sealing head 94 having a coupling member 102 formed of split collars for holding the two parts together and having the outer part beveled at the end portion 96 for receiving the flared end of a piece of pipe 10. The pipe 10, under internal pressure, is expanded from the solid line position of Figure 4 into the dotted line position 10a, in which it forms a uniform continuation of its own flared end. An air purge valve 98 communicates, by means of a through passage in the sealing head 94, with the interior of the pipe 10, such passage being indicated at 100. A spacer ring 103 is carried on the outside of the sealing head 94 in abutment with a shoulder thereon and directly engages the flared end of the pipe 10. Mounted adjacent to the backing and sealing member 103, another limit switch LS3 is provided which is engaged by the pipe as it is inserted over the sealing head 94.

A set of feed skids 104 and a set of run-out skids 106, Figure 2, straddle the frame 12 of the present apparatus and operate to introduce lengths of pipe by gravity in the direction of the arrows 108 and 109 toward and from the present apparatus. Operating in conjunction with the feed skids is a rockshaft 111 and a plurality of transfer plates 110, all of which are more completely shown and described in the copending McConnell application Serial No. 535,081, filed September 19, 1955, now U.S. Patent No. 2,820,573. Reference may be had to said copending application for a fuller understanding of the operation of the handling plates 110, but, briefly, the plates pick up the sections of pipe, one at a time, from the feed skids 104 and transfer the same to a pipe supporting saddle 112, which is in line with the respective sealing heads 62 and 94.

In the operation of the apparatus of Figures 1 through 4, the sealing head 62 is moved to its extreme leftward position by appropriate operation of the retractable double-acting set-out cylinders 60. The sealing head 94 is moved to its extreme rightward position in which it engages the limit switch LS1 under action of the reversible electric motors 36 and the interconnecting chain 32. The transfer plates 110 are operated to transfer a piece of pipe onto the saddle 112 in alignment with the respective heads 62, 94 by suitable means, not shown. The ends of the pipe 10 are flared for a short length in order to accommodate the full lengths of the sealing heads 62 and 94. Thereupon, the set-out motors 60 are actuated to move the vertically extending bar 56 and the sealing head 62 to the right to a point at which the head is inserted into the flared end of the pipe 10. Simultaneously, fluid entering through the hydraulic inlet pipe 52 is admitted to the rear end of the hydraulic jack motor 50 and at the proper point a blocking valve, not shown, is closed trapping the admitted hydraulic fluid for hydraulically locking the plunger 54 in place to resist end thrust on the sealing head 62. The electric motors 36 are actuated to drive the chains 32 and shift the head and the carriage 82 to the left, and an initial rapid movement of the chains is accomplished which is regulated only in terms of motor speed. After the test head 94 penetrates the flared end of the pipe adjacent thereto, the limit switch LS3 is actuated and is shifted to a torque responsive motor control which rapidly slows down the advance of the head 94 and causes the back-up ring 103 to engage the pipe 10 gently.

The fill check valve 72 is opened and the air purge valves 76, 98 are opened whereupon hydraulic fluid enters the inlet 70 and completely fills the space in the pipe between the heads 62 and 94. Trapped air is led off through the air purge valves 76, 98 and, as soon as all trapped air escapes, the valves 76 and 98 are closed. The high pressure line 74 and the interior of the pipe 10 are pressurized and gradually the pressure is increased until a point is reached at which the pipe expands into the dotted line position 10a of Figures 3 and 4 against the inside diameter of the mantle envelope 69. Expansion of this pipe girthwise is accompanied by a corresponding foreshortening of the pipe and the motors 36 are so actuated, not only to provide constant end sealing pressure on the pipe, but also to cause the chain and the moving head 94 to follow up foreshortening action of the ends of the pipe toward one another. The pipe transfer plates 110 tend to clamp the pipe into the saddle 112 during the expansion operation and hold the same against lateral shift during its expansion. Following expansion to the approximate inside diameter of the mantle 69 corresponding to the diameter of its flared ends over the sealing heads 94, the pipe is allowed to remain under a pressurized state for a short time interval and then the internal pressure therein is released. The pressure may be reinstated as a leak testing procedure subsequent thereto. Thereafter, the motors 36 are operated to move the chains 32 and retract the sealing head 94 to its rightward extreme position. The hydraulically locked jack motor 54 is relieved of pressure through the pipe 52, and the double-acting setout motors 60 are operated to retract the vertical bar 56 and withdraw the sealing head 62 from the end of the expanded pipe 10. Finally, the transfer plates 110 are operated to remove the pipe 10 from the saddle 112 for disposal, preferably under gravity, onto the run-out skids 106.

Automatic control means may be provided for controlling the expansion and follow-up motion of the present pipe expansion and testing apparatus.

Figure 5:
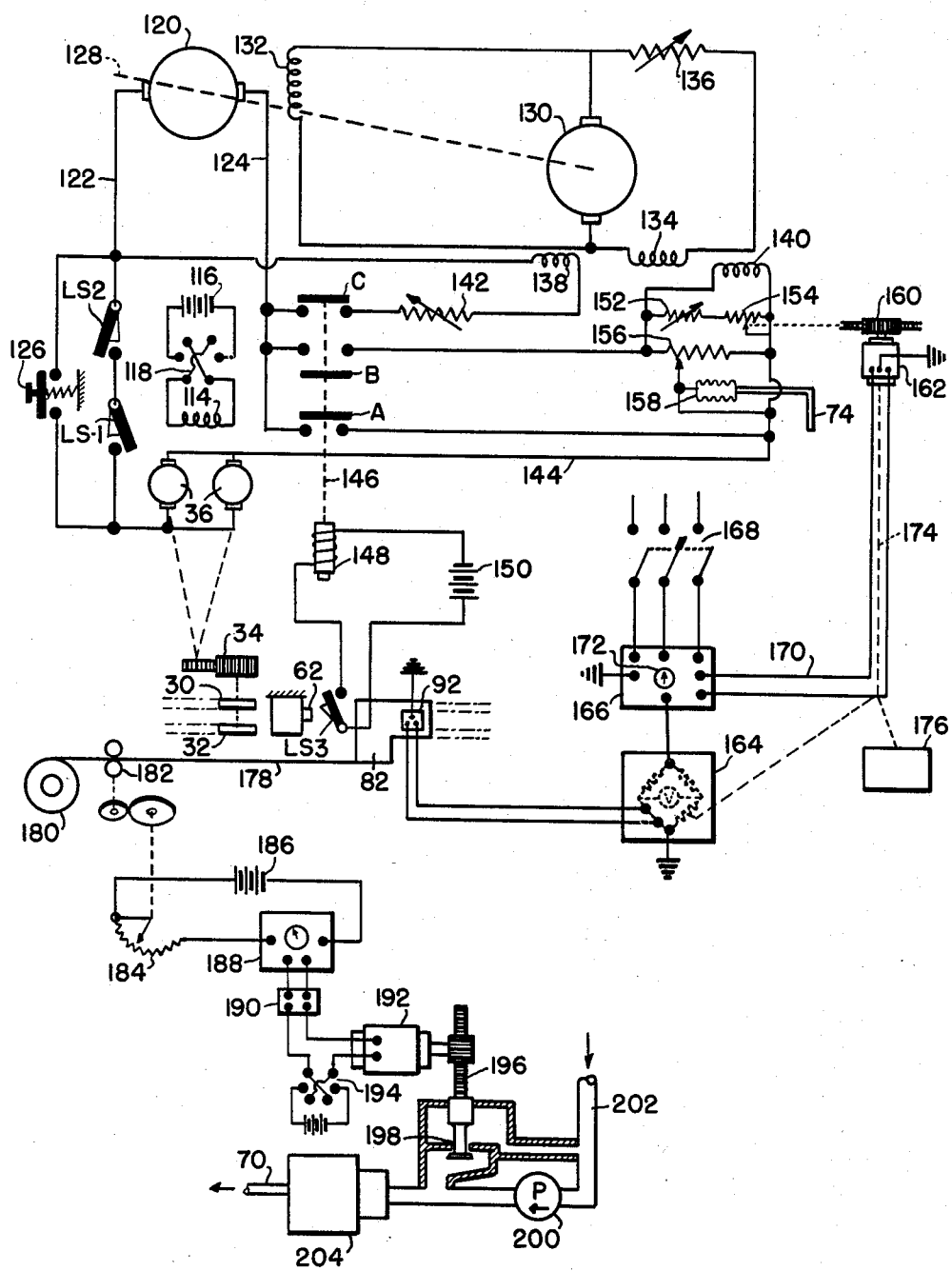
Figure 5 is a control diagram for the present apparatus.

Illustrative of one form of the automatic control means is the schematic diagram of Figure 5. The reversible direct current motors 36 are shown connected to the reduction gearing 34 which, in turn, drives the sprockets 30 and the chain 32 for positioning the head carrying carriage 82. The stationary structure for supporting the head 62 is shown opposite in position to the limit switch LS3 carried by the carriage 82. The carriage 82 also carries the strain gauge shown at 92. The motors 36 have a direct current field winding 114, which is connected to a source of constant D.C. energy 116 by means of a reversing switch for changing the direction of rotation of the motors 36. The motors 36 are electrically driven by means of a D.C. generator 120 having a pair of load wires 122 and 124 appropriately connected to the armatures of the motor 36. Included in the load wire 122 are the left and right limit switches LS2 and LS1, which are stationarily carried on the frame 12 of the present pipe apparatus. Movement of the carriage 82 to either extreme limiting positions defined by the limit switches LS1 and LS2 causes the load wire circuit to be interrupted and the load wire circuit may be restored by means of a manually controlled starting switch 126. When either limit switch is opened, either deliberately or inadvertently due to overtravel of the chain and the carriage 82, an operator appropriately reverses the switch 118 and pushes the manual push button 126 to cause the motors 36 to drive the carriage 82 out of its position of overtravel. The generator 120, which may form one component of a two-component motor generator set, is driven by means of an input shaft 128 which also drives a D.C. exciter 130 for the generator 120. The exciter 130 supplies a field winding 132 for the generator 120 and is a shunt wound machine for a shunt 134 provided with a trimming rheostat 136 in series therewith. A pair of bucking coils 138 and 140 are associated with the shunt field winding 134 of the generator exciter 130 to control the excitation of the exciter in order to control the excitation of the generator, thereby controlling the speed and torque of the motors 36. The bucking coil 138 includes a trim rheostat 142 in circuit therewith and bridges across the load wires 122, 124, so as to develop a bucking field proportionate to the countervoltage and consequently to the speed of the motors 36. The load wire 124 from the generator 120 is connected to a motor input wire 144, which includes in series therewith a set of contacts A carried by an electromagnetic switch 146 under control of a solenoid coil 148. The solenoid coil 148 is controlled by means of the limit switch LS3 which connects the same to a source of D.C. potential 150. When the solenoid coil 148 is deenergized, the switch contacts A are closed to supply the motor input wire 144 with current from the generator load wire 124 and also an upper set of switch contacts C is closed to render the bucking coil operation at 136 active to control the excitation of the generator 120 as a function of motor countervoltage. As the motors 36 run too fast, the excitation of the bucking coil 138 increases so as to decrease the shunt excitation of the exciter 130 and thereby decrease the current in the load wires 122, 124. Conversely, reduced speed of the motors at 36 causes the bucking coil 138 to weaken and allows the generator exciter at 132 to increase the load current through the conductors 122, 124.

A middle set of contacts B for the switch 146 is included in circuit with the load wire 124 so as to connect the same through the bucking coil 140 to the motor supply wire 144. When the limit switch LS3 is actuated, the switch 146 is operated to open circuit the bucking coil 138 and close the circuit through the bucking coil 140 connected through the load supply wire 144 for the motors 36. In parallel therewith, the bucking coil 140 includes a pair of series-connected devices, one of which is a rheostat 152 and the other of which is a slide wire potentiometer 154. Appropriate control of the rheostat 152 is such as to insure a minimum torque on the motors 36 under the following principle. When the motor current increases, the field strength of the bucking coil 140 increases and the generator excitation thereupon decreases at 132. Accordingly, the current supplied to the motors 36 tends to decrease and, hence, the motors operate to produce a substantially constant regulated minimum torque. The slide wire of the potentiometer 154 is adjusted in a manner hereinafter described to cause the motor torque to decrease whenever the thrust sensing strain gauge 92 senses an increase in pipe thrust above a desired value.

Another slide wire potentiometer 156 is connected in a shunt arrangement across the bucking coil 140 and has the slider wire thereof positioned by means of a device 158 which may be an electric pressure gauge, but is diagrmmatically shown in the form of a pressure capsule. The pressure capsule 158 is connected in the pressure sampling high pressure link 74 leading to the pressure inlet passage 64 for expanding the pipe. Increased pressure on the pipe, resulting in expansion of the pressure capsule 158, Figure 5, causes the resistance of the potentiometer 156 to decrease and accordingly to decrease the field of the bucking coil 140. Hence, the torque developed by the motors 36 increases so as to increase the end sealing pressure on the pipe to withstand the increased internal pressure exerted therewithin. The slide wire of the potentiometer 154 is positioned by means of a rack and pinion 160 under control of a reversing electric motor 162 controlled in response to the load cell strain gauge 92. The load cell strain gauge 92 is connected through a Wheatstone bridge unit 164 to an appropriate amplifier device 166. The amplifier device is supplied with electric energy through a switch 168 and controls the operation and position of the motor 162 by means of a pair of conductors 170. The amplifier device also mounts an indicator hand 172 which reads in terms of pounds thrust on the pipe being expanded. This end thrust may amount to 1,200,000 pounds under certain circumstances. The motor 162 is appropriately connected to a shaft 174 which drives a rheostat within the Wheatstone bridge unit 164. Unbalance in the Wheatstone bridge, due to a change in the resistance of the strain gauge 92, results in a signal being registered on the amplifier, which, in turn, energizes the motor 162 to rebalance the Wheatstone bridge through operation of the shaft 174. Operation of the shaft 174 additionally causes a change in the position of the slide wire of the potentiometer 154 to vary the motor torque and pipe end thrust. When the load on the strain gauge 92 increases, the current therethrough increases due to lowered resistance therein. Such increase of current registered on the Wheatstone bridge 164 and the amplifier 166 causes the motor 162 to shift the slider of the potentiometer 154 to the right so as to increase the bucking field strength at 140. Increase of the bucking field strength causes the torque developed by the motors 36 to decrease and slack off part of the excessive thrust being exerted on the pipe. The shaft 174 for the motor 162 may also be connected to a printer device 176 for recording the thrust on the pipe at various time intervals uniformly spaced apart.

It is, therefore, apparnt that, under initial operation of the motors 36, the motors are regulated by the bucking coil 138 in a manner to be speed sensitive so as to move rapidly under little or no load. The motors are shown to be connected in parallel, but actually they may be connected for series-parallel operation in running in an arrangement whereby their starting current is limited due to being initially connected in series and then switched to parallel for running. Final motion of the motors 36, after the limit switch LS3 is closed, is controlled under operation of the bucking coil 140. As soon as the switch contact B is closed, the switch contacts A and C are opened and consequently the motors are driven slower to supply a predetermined minimum torque and are thrust responsive in a manner whereby their torque increases as end thrust decreases due to the foreshortening of the pipe. Furthermore, the motor torque is increased or decreased depending on increase or decrease of internal pressurization at 158 measured in the pipe.

In Figure 5, a tape 178 is shown connected to the carriage 82 and it is spring loaded so as to be self re-winding after being partly unwound from a reel 180. The tape passes between a set of opposed rollers 182, one of which is geared to a potentiometer 184 to move the slide wire thereof. The potentiometer 184 is connected in circuit with a source of direct current energy 186 and with an instrument 188 for recording length, position and activity of the piece of pipe being tested and/or expanded. As the pipe is expanded, the motor follow-up mechanism causes the carriage 82 to shift and shifts in the position sensed by the instrument 188 which, therefore, can correct its reading for the length of pipe, for the position of the pipe, and for the relative movement thereof. A position of the pipe, in which relative movement is absent, is sensed by the instrument 188 which, under static conditions, causes a time delay switch 190 to close to energize a motor 192 which is also under control of a reversing switch 194. The motor 192, through a rack and pinion 196, controls a by-pass dump valve 198 and also has a connection, not shown, to the fill check valve 72 of Figure 3. The by-pass valve 198 is included in a by-pass around an expansion pressure pump 200, which pressurizes hydraulic fluid, such as water, from an inlet pipe 202 and delivers the pressurized water to a pressure intensifier 204, suitably connected to the fill tube 70 for the present apparatus. The purpose of the valve 198 and time delay switch 190 is to vent the pressure within the pipe after the pipe has fully expanded and remained in a quiescent state under pressure for a predetermined time.

It will be apparent from the foregoing that a high pressure pipe expanding and testing apparatus is provided, including novel follow-up mechanism. The mechanism follows up the pipe as the ends of the same foreshorten and includes a pipe reaction thrust responsive control mechanism which not only maintains a predetermined minimum end thrust on the pipe but which is operable to move a sealing head under increased thrust against the pipe to compensate for the thrust dissipated due to the pipe foreshortening movement. Further included with the follow-up mechanism is a novel modulating device sensitive to hydraulic fluid pressure in the pipe to modulate the effect of the thrust responsive control mechanism to the extent of further increasing thrust with increase in the pipe expanding pressure exerted by the hydraulic fluid.

Variations within the spirit and scope of the invention described are equally comprehended by the foregoing description.

What is claimed is:

1. In apparatus for internally pressurizing pipe, a frame having a saddle adapted to support pipe in a position on the frame, a plurality of endless bands trained for movement along the frame, a carriage connected to the bands and shiftable toward and from the position of the pipe, pipe end sealing means mounted to the carriage, a plurality of stallable electric motors, and a single torque drive means having an output portion common to said plurality of endless bands for shifting said carriage and having an input portion common to said stallable electric motors and operable by the latter at an initially rapid running rate in causing said carriage and pipe end sealing means to approach the position of the pipe and then automatically changing to a high torque reduced rate of running the carriage immediately prior to engagement of the sealing means with the pipe end thereupon to gently engage same so as to stall out said motors while continuing to sustain their high torque.

2. In apparatus for internally pressurizing pipe, a frame having a saddle adapted to support pipe in a position on the frame, an endless band trained for movement along the frame, a carriage connected to the band and shiftable toward and from the position of the pipe, pipe end sealing means mounted to the carriage, torque applying means connected to said endless band for shifting said carriage toward the position of the pipe to engage the same by means of the pipe end sealing means, and load cell means for directly sensing the end thrust of the pipe to vary the magnitude of the applied torque inversely with pipe end thrust.

3. In a machine for hydraulically processing pipe or the like to expand the same, a sealing head engageable with one end of the pipe, means for introducing hydraulic fluid into the pipe when sealed, head reciprocating means, and means connected to said head reciprocating means controlling movement of said head as the pipe changes length during the expansion process including load cell means responsive to pipe thrust and operable thereby to move said head under increased thrust to compensate for the thrust being dissipated due to the foreshortening movement of the expanding pipe.

4. Apparatus for internally pressurizing a section of pipe or the like between two relatively movable sealing heads, one of said heads being a thrust reaction head engageable with the end of the pipe, said apparatus comprising a shiftable carriage for the other of said sealing heads, power means for causing the carriage to thrust the head against an adjacent end of the pipe in sealing relationship, and regulator means comprising a compression strain gauge sensitive to magnitude of thrust on the pipe for causing said power means to shift the carriage and maintain a predetermined minimum end sealing pressure thereon at all times.

5. Apparatus for internally pressurizing a section of pipe or the like between two relatively movable sealing heads, one of said heads being a thrust reaction head engageable with the end of the pipe, said apparatus comprising a shiftable carriage for the other of said sealing heads, power means for causing the carriage to thrust the head against an adjacent end of the pipe in sealing relationship, regulator means sensitive to the intensity of internal pressure in the pipe for causing said power means to increase the developed thrust with increase of internal pressure in the pipe, and regulator means sensitive to magnitude of thrust on the pipe for causing said power means to shift the carriage and maintain a predetermined minimum end sealing pressure thereon at all times.

6. In a machine for hydraulically processing pipe or the like to expand the same, a sealing head engageable with one end of the pipe, means for introducing hydraulic fluid into the pipe when sealed, head reciprocating means, and means connected to said head reciprocating means controlling movement of said head as the pipe changes length during the expansion process, including a reaction thrust cell controlling the same for maintaining a predetermined minimum thrust on said pipe and operable to move said head under increased thrust against the pipe to compensate for the thrust being dissipated due to the foreshortening movement of the expanding pipe, and further including means sensitive to pressure corresponding to hydraulic fluid pressure in said pipe to modulate the effect of the thrust by increasing it with increase in the pipe expanding pressure exerted by the hydraulic fluid.

7. A machine providing for the internal pressure expanding, between two sealing heads, of a pipe or the like comprising a frame, an endless chain trained for movement on the frame, a stationary structure at one end of the frame having short stroke hydraulic motor means, a first pipe end sealing means reciprocable a limited distance by means of said hydraulic motor means, a carriage shiftably mounted for substantial travel from the other end of the frame and connected to the chain, a second pipe end sealing means mounted to the carriage, electric motor means connected to said chain for reciprocating said carriage and said second pipe end sealing means, and control means activated by the pipe thrust for automatically controlling the reciprocatory movement of at least one of said sealing heads in one direction relative to said pipe.

8. In apparatus for internal pressure stressing of a length of pipe between a pair of sealing heads at least one of which is movable, and having electric motor load means connected through an interengaged drive to said movable head, the combination therewith of an excited electric generator unit, electrical connection means comprising an output circuit, said electric motor load adapted by means of said electrical connection means for receiving and being driven by electrical output on said generator unit, one means sensitive to one operating characteristic of said excited generator output and operating to control performance of said electric motor load so as to run same in a high speed operation, and other means sensitive to another operating characteristic of said excited generator output operable to control said motor load so as to run same in a high torque operation at zero or a gradual rate as determined by load resistance, said sealing head having an initially high speed rate of approach to the pipe and then being moved at said gradual rate to relatively gently engage and introduce an end thrust on the pipe length developed under the electric motor stall torque.

9. In a machine for internal pressure stressing of pipe or the like between a pair of sealing heads at least one of which is movable, and having electric motor load means connected with an interengaged drive to said movable head, the combination therewith of an excited electric generator unit, electrical connection means comprising an output circuit, said electric motor load means adapted by means of said electrical connection means for receiving and being driven by electric output from said generator unit, control means sensitive to the voltage of said excited generator output as a function of the electric motor speed and operable for controlling performance of the latter so as to run the electric motor in a high speed operation for causing said movable head to approach a length of pipe at a rapid rate, second control means sensitive to output current as a measure of the electric motor output torque and operable for controlling performance of the latter so as to run the electric motor in a high torque operation at a gradual or zero rate dependent upon load resistance causing said head to gently engage and thereafter seal said pipe length under electric motor stall torque, and means including a pipe-actuated switch mounted for movement with said head for rendering the second control means effective and the first-named control means ineffective.

10. In a machine for internal pressure stressing of pipe or the like between a pair of sealing heads, and having electric motor load means connected with an interengaged drive to move one of said heads, the combination therewith of an excited electric generator unit, electrical connection means comprising an output circuit, said electric motor load means adapted by means of said electrical connection means for receiving and being driven by electric output from said generator unit, control means sensitive to the voltage of said excited generator output as a function of the electric motor speed and operable for controlling performance of the latter so as to run the electric motor in a high speed operation for causing said head to approach a length of pipe at a rapid rate, second control means sensitive to output current as a measure of the electric motor output torque and operable for controlling performance of the latter so as to run the electric motor in a high torque operation at a gradual or zero rate dependent upon load resistance causing said head to gently engage and thereafter seal said pipe length under electric motor stall torque, and pressure sampling and compensating mechanism connected to one of said control means to modulate the motor torque as a function of the effective longitudinally acting pressure area acting to separate the sealing head and the sealed pipe, said sampling and compensating mechanism having a sampling tube connected to the fluid inside a pipe being stressed.

11. In a machine for internal pressure stressing of pipe or the like between a pair of sealing heads at least one of which is movable, and having electric motor load means connected with an interengaged drive to said movable head, the combination therewith of an excited electric generator unit, electrical connection means comprising an output circuit, said electric motor load means adapted by means of said electrical connection means for receiving and being driven by electric output from said generator unit, control means sensitive to the voltage of said excited generator output as a function of the electric motor speed and operable for controlling performance of the latter so as to run the electric motor in a high speed operation for causing said head to approach a length of pipe at a rapid rate, second control means sensitive to output current as a measure of the electric motor output torque and operable for controlling performance of the latter so as to run the electric motor in a high torque operation at a gradual or zero rate dependent upon load resistance causing said head to gently engage and thereafter plug said pipe length under stall torque of said electric motor, and thrust sensitive recording means for recording direct end thrust effective between said pipe and said heads developed under the stall torque aforesaid.

12. In a machine for internal pressure expanding of pipe or the like between a pair of sealing heads at least one of which is movable, and having electric motor load means connected with an interengaged drive to said movable head, the combination therewith of an excited electric generator unit, electrical connection means comprising an output circuit, said electric motor load means adapted by means of said electrical connection means for receiving and being driven by electric output from said generator unit, control means sensitive to the voltage of said excited generator output as a function of the electric motor speed and operable for controlling performance of the latter so as to run the electric motor in a high speed operation for causing said head to approach a length of pipe at a rapid rate, second control means sensitive to output current as a measure of the electric motor output torque and operable for controlling performance of the latter so as to run the electric motor in a high torque operation at a gradual or zero rate dependent upon load resistance causing said head to gently engage and thereafter preparatory to expanding to seal said pipe length under stall torque of said electric motor, and pipe end location responsive means connected to move with said movable head to determine and to establish a measurement thereof when said pipe upon subsequently being expanded reaches an ultimate length.

13. In a machine for internal pressure expanding of pipe between a pair of sealing heads at least one of which is movable, and having an electric motor load connected by an interengaged chain drive to said movable head, the combination therewith of an excited electric generator unit, electrical connection means comprising an output circuit, said electric motor load adapted by means of said electrical connection means for receiving and being driven by electric output from said excited generator unit, exciter control means arranged to sense the voltage of said excited generator output as a function of the running speed of said electric motor load and operable for controlling performance of the latter so as to run same in a high speed operation, second exciter control means arranged to sense output load current as a measure of output load torque of said electric motor load and operable to control performance of the latter so as to run the same in a high torque operation at zero or gradual rate dependent upon load resistance for causing said movable head in approaching the free length of pipe after initial contact to thereafter gently enter and plug same by a sustained thrust developed under the stall torque of said electric motor, pipe end location responsive means connected to move with said movable head to sense said contact for rendering said second exciter control means effective and the first-named exciter control means ineffective, separate means actuable to record the developed thrust upon and the ultimate length measurement of a pipe being expanded, and pipe end location responsive means connected to said pipe length recording means to produce a recorded measurement at the time said pipe being expanded reaches its ultimate length.

References Cited in the file of this patent

UNITED STATES PATENTS

| | | |
|---|---|---|
| 2,242,658 | Protin | May 20, 1941 |
| 2,667,136 | Reichl et al. | Jan. 26, 1954 |
| 2,671,338 | Reichl | Mar. 9, 1954 |
| 2,684,590 | Lassman | July 27, 1954 |
| 2,707,876 | McConnell et al. | May 10, 1955 |

FOREIGN PATENTS

| | | |
|---|---|---|
| 717,403 | Germany | Feb. 13, 1942 |